United States Patent [19]

Burwell et al.

[11] Patent Number: 5,539,734

[45] Date of Patent: Jul. 23, 1996

[54] METHOD OF MAINTAINING PVC STATUS PACKETIZED COMMUNICATION SYSTEM

[75] Inventors: Wayne Burwell, Ottawa; Darren Helmer, Nepean, both of Canada

[73] Assignee: Newbridge Networks Corporation, Kanata, Canada

[21] Appl. No.: 278,492

[22] Filed: Jul. 21, 1994

[51] Int. Cl.⁶ .................................................... G06F 13/00
[52] U.S. Cl. ........................... 370/60; 370/60.1; 370/94.1
[58] Field of Search ........................... 370/60, 60.1, 94.1, 370/95.2

Primary Examiner—Jack B. Harvey
Assistant Examiner—John Travis
Attorney, Agent, or Firm—Marks & Clerk

[57] ABSTRACT

A method of managing an interface to an internal message pipe, such as an FDDI bus, comprises sending a status enquiry message to request the status of each PVC having a DLCI in a specified range, receiving a subset status message containing sequence exchange numbers corresponding to the last status message sent out, updating the contents of a station's PVC's in response to the received subset status message, and propagating PVC status changes between entities on the pipe.

6 Claims, 3 Drawing Sheets

| IE Identifier = $1A |   |   |   |   |
|---|---|---|---|---|
| IE Length = $05 |   |   |   |   |
| 0 | 0 | StartDLCI |   |   |
| 0 | StartDLCI | 0 | 0 | 0 |
| 1 | StartDLCI |   |   | 0 |
| DLCI Range (msb) |   |   |   |   |
| DLCI Range (lsb) |   |   |   |   |

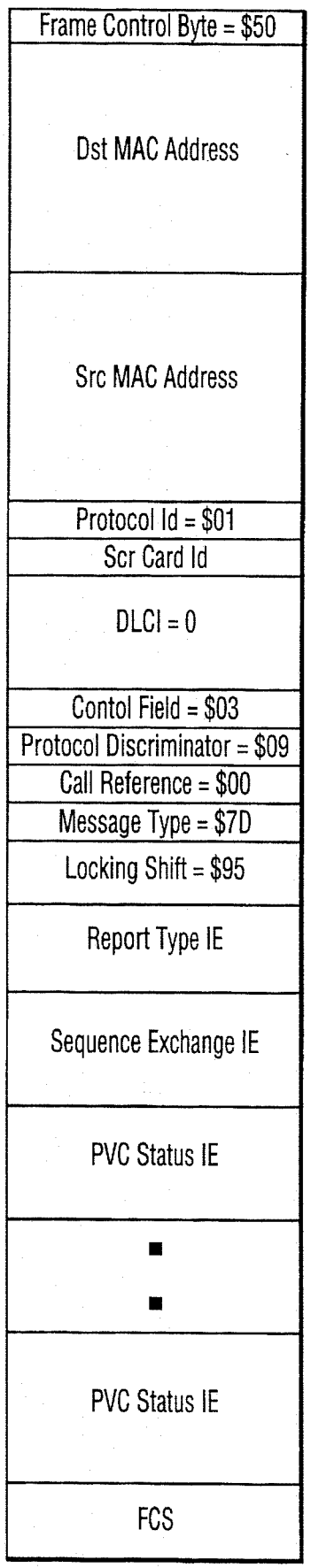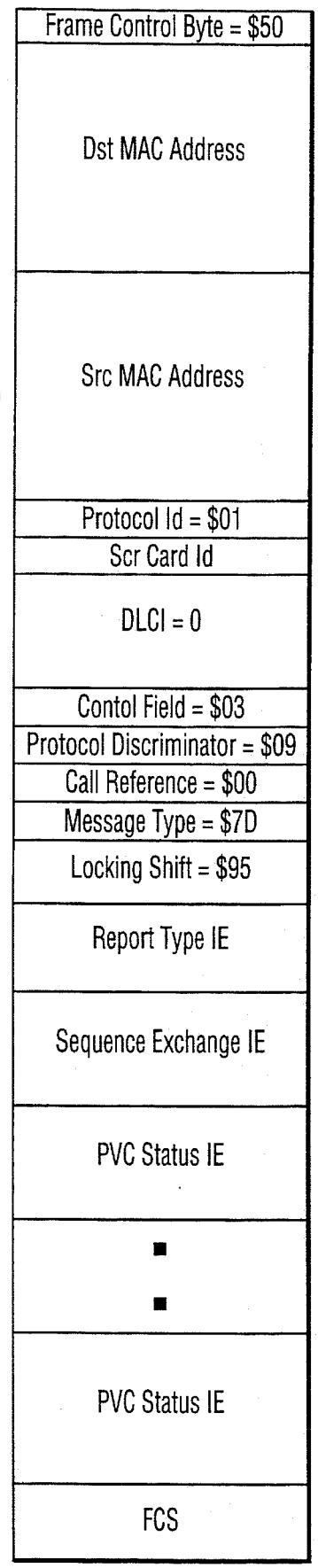
FIG. 4
FIG. 5

METHOD OF MAINTAINING PVC STATUS PACKETIZED COMMUNICATION SYSTEM

BACKGROUND OF THE INVENTION

This invention relates to method of managing a communications interface, such as a frame relay interface.

Frame relay is a technology for access to wide area networks. The frame relay protocol operates at a sublayer of the data link layer, which provides the minimum functionality needed to take advantage of the statistical properties of the communication. Unlike preexisting protocol suites in use in general topology subnetworks, it also performs relaying, and multiplexing at this sublayer. Other data link layer functions are provided only in systems connected to the edges of the frame relay subnetwork.

Frame Relay presently uses ANSI T1.617 Annex D which is herein incorporated by reference, or the very similar CCITT Q.933 Annex A protocol, to provide the status signaling protocol requirements between Frame Relay devices.

The Newbridge Networks Corporation Mainstreet® 36120 switch is a single unit frame switch, with ports providing the correct status signaling protocol to external devices. In particular, it can include FRE (Frame Relay Engine) cards via a wiring hub known as a FASTbus. The FRE card is a multi-processor card with a 68340 general purpose control processor and two 68EC040 processors used for frame switching and I/O.

There is a need to provide status signaling between FREs in addition to external Frame Relay devices.

Annex D cannot maintain the status of the required number of inter-FRE 36120 connections due to its close coupling with management frame size; elements which describe the present signaling status of all connections on a link must fit inside of a single frame. Since the FASTBus is based on FDDI technology and is therefore limited to a maximum frame size of 4500 octets, this also limits the number of information elements per frame.

Annex D also provides for an 'Asynchronous STATus' message frame, which allows a Frame Relay device to inform its connected device of a change in signaling status outside of the normal, regular interval poll and response messaging. One management frame must be used for each connection's change of state. Unfortunately, a simultaneous change in the state of a link with multiple connections can result in hundreds of management frames being exchanged.

An object of the invention is to overcome this problem.

SUMMARY OF THE INVENTION

Accordingly the present invention provides a method of managing an interface to an internal message pipe interconnecting communications entities in a packetized communications system wherein permanent virtual connections (PVCs) are established in said pipe, the method comprising sending from a transmitting entity a subset status enquiry message to request the status of each PVC in the pipe having a DLCI (Data Link Connection Identifier) in a specified range, receiving a subset status message containing sequence exchange numbers corresponding to the last status message sent out, updating an entity's PVC's in response to said received subset status message, and propagating PVC status changes between the communicating entities on said pipe.

The interface may be a frame relay interface and the message pipe an FDDI bus, in which case the entities are frame relay engines, i.e. devices for implementing frame relay switching operations. The invention is also applicable to other protocols, such as ATM, (Asynchronous Transfer Mode) for example.

In the preferred embodiment, the method is designed to minimize the time required to determine initial PVC status, the time required to propagate PVC status changes, the bandwidth utilized on the message pipe, and the processor overhead required to implement the method.

Each station on the pipe operates an instance of the method between itself and every other reachable station.

The method is a thus a modified version of the LMI (Layer Management Interface) and ANSI Annex D protocols which are used to propagate PVC status information between frame relay network switching elements. These protocols also contain procedures which monitor the WAN link integrity between the switches. Since the FDP (Fastbus Discovery Protocol) monitors the logical link integrity between stations on the message pipe, these procedures can be omitted. Once established, links are considered to be in service until the discovery Protocol declares the far end unreachable.

Until a target station is detected by the FDP (FASTbus Discovery Protocol), all PVC's connected to that station are considered inactive. Upon detection of a target station via the FDP, the station starts a link with that target station. The protocol enters the initialization state at startup.

The protocol does not allow more than one outstanding message at any given time. After sending a message, a response must be received or a time-out must occur before a subsequent message may be sent. Sequence numbers are used to ensure that responses to timed-out messages are ignored. A message will be ignored if the sequence exchange number of an incoming message does not match the number transmitted in the last outgoing message.

The method in accordance with the invention operates over DLCI 0, which is the standard signaling DLCI (Data Link Connection Identifier).

BRIEF DESCRIPTION OF THE DRAWINGS

The invention will now be described in more detail, by way of example only, with reference to the accompanying drawings, in which:

FIG. 4 shows the format of the report status message; and

FIG. 5 shows an asynch status report message.

DESCRIPTION OF THE PREFERRED EMBODIMENTS

Figure 1:
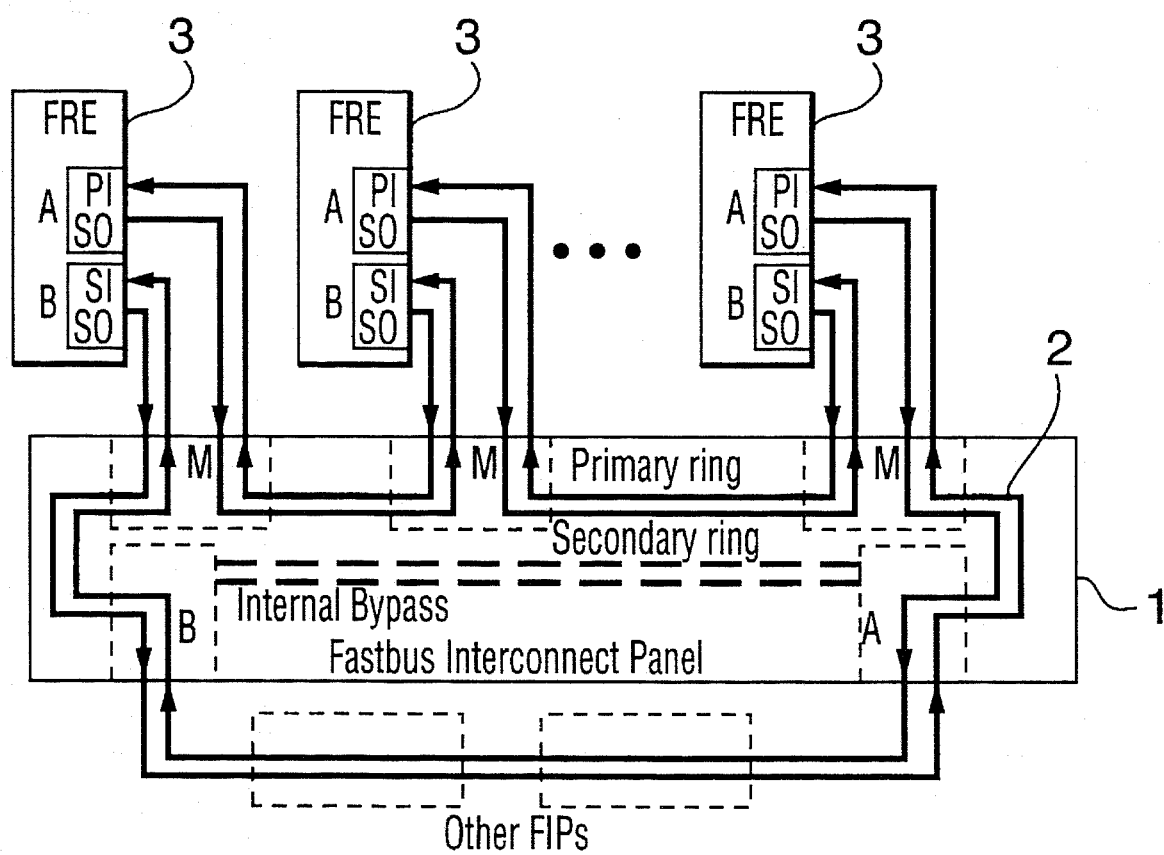
FIG. 1 shows one embodiment of a frame relay system in which the method according to the invention is implemented.

In FIG. 1, the system comprises a wiring hub 1 comprising a dual FDDI ring 2 consisting of shielded twisted pair wires. Ring 2 implements the standard FDDI protocol. Frame relay engine cards 3, mounted in the backplane of a Newbridge Networks Maintstreet™ 36120 switch and performing a frame relay switching function are connected in the ring as shown. The wiring hub 1, by providing an FDDI link between the FRE cards 3, thus permits expansion of the Mainstreet® 36120 switch.

When the system starts it immediately enters the initialization state. The purpose of this state is to learn the status of each PVC configured at the far end of the link. The procedures for this state will now be described.

First, the station sends a Subset Status Enquiry message to request the status of each PVC having its DLCI in the specified range. The range is chosen in such a way that the resulting Subset Status message will fit in a single FASTBus frame.

If a Subset Status message with the correct sequence numbers is not received within nT1 seconds, the station re-transmits the Subset Status Enquiry message (after incrementing the sequence number). If the nT1 time-outs persist, the station continues transmitting Subset Status Enquiry messages for the same DLCI range indefinitely.

Upon receipt of a Subset Status message containing sequence exchange numbers corresponding to the last Subset Status Enquiry message sent, the station will parse the Subset Status message and update the status's of its PVC's accordingly.

The station then transmits a Subset Status Enquiry message for the next DLCI range which may be contained in a single FASTBus frame. The station continues transmitting Subset Status Enquiry messages until the complete range of DLCI's has been queried.

After the Subset Status message for the last DLCI range has been parsed the link enters the post-initialization state of the protocol.

In this state, the protocol propagates status changes to the far end of the link. This includes information about new and deleted PVC's. Periodic subset status polling is also performed at regular intervals for robustness. The procedures are as follows:

When a PVC is created or deleted or the status of an existing PVC changes (due to incoming Status messages or link failures on the WAN side of the connection) the station transmits an Asynch Status message to propagate the change to the target station.

If the sending station has not received an Asynch Status Ack message with the correct sequence number within nT1Ack seconds it will re-transmit the Asynch Status message (after incrementing the appropriate sequence number). If the nT1 time-outs persist, the station will continue transmitting the Asynch Status message indefinitely.

When a station receives an Asynch Status message, it transmits an Asynch Status Ack in response. The Asynch Status Ack contains a PVC status IE (Information Element) for any configured PVC's that had their new bit set in the Asynch Status message.

Upon receipt of an Asynch Status Ack message containing sequence exchange numbers corresponding to the last Asynch Status message sent, the station will parse any PVC status IE's that may be contained in the message and it will consider the status change to have been propagated successfully.

Every nN1 nT1Ack intervals the station sends a Subset Status Enquiry message to the far end of the FMI (Frame Management Interface) link.

No retransmission occurs if a Subset Status message with the correct sequence numbers is not received within nT1Ack seconds.

Upon receipt of a Subset Status message containing sequence exchange numbers corresponding to the last Subset Status Enquiry message sent, the station parses the Subset Status message and updates the status's of its PVC's accordingly.

If the FDP detects that a target station has been removed from the bus, all PVC's connected to that station are declared inactive and the the system ceases the transmission of messages to that station.

The message formats are based on the messages defined in ANSI T1.617 Annex D, and are described in more detail below. The message format was designed so that size of the PVC Status IE field is small.

Figures 2, 3:
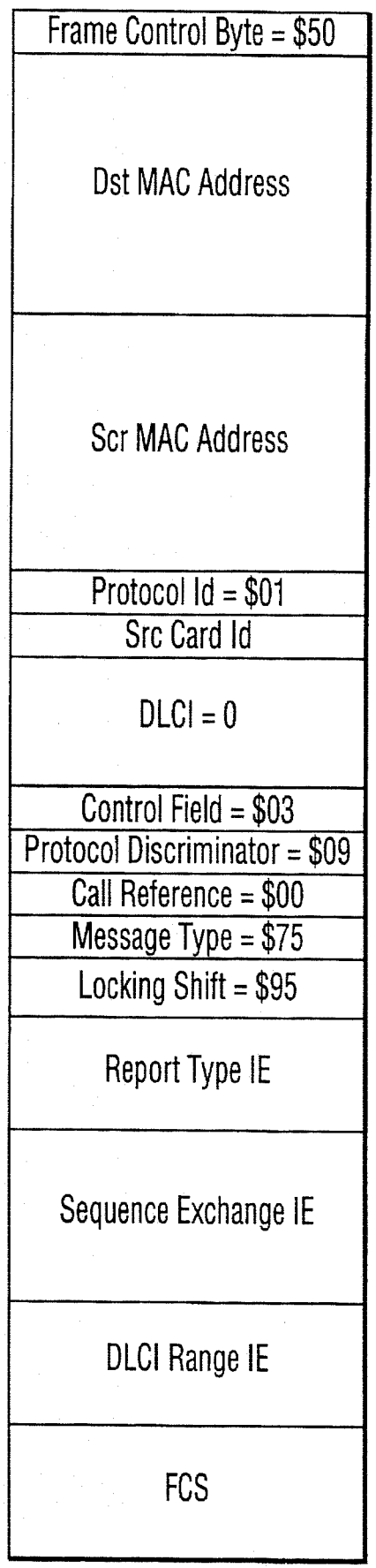
FIG. 2 shows the format of a status enquiry message.
FIG. 3 shows the DLCI range.

The status enquiry message is shown in FIG. 2 and comprises a Frame Control Byte, Dst MAC Address, Src MAC (Media Access Control) Address, Protocol Id and FCS fields.

The Address field is the 3-byte LAPF (Link Access Protocol-Frame Relay) address format. The Control, Protocol Discriminator, Call Reference and Message Type fields are as defined in Annex D referred to above. The Report Type IE field IE is as defined in Annex D. The protocol uses only Subset Status messages, so the value of the Report Type is $03. The Sequence Exchange IE is also as defined in Annex D. The DLCI Range IE field is shown in more detail in FIG. 3.

The format of the Status message is shown in FIG. 4. It also includes a Frame Control Byte, Dst MAC Address, Src MAC Address, Protocol Id and FCS (Frame Check Sequence). The Address field is the 3-byte LAPF address format.

The Control, Protocol Discriminator, Call Reference and Message Type fields are as also as defined in Annex D. The Report Type IE is also as defined in Annex D. The protocol uses only Subset Status messages, so the value of the Report Type is $03.

The PVC Status IE is as defined in Annex D. One PVC Status IE will be present for each PVC configured between the two stations. The Sequence Exchange IE is as defined in Annex D.

The format of the asynchronous Update Status message is shown in FIG. 5. The Frame Control Byte, Dst MAC Address, Src MAC Address, Protocol Id and FCS fields are as defined above. The Address field is the 3-byte LAPF address format.

The Control, Protocol Discriminator, Call Reference and Message Type fields are as defined in Annex D. The Report Type IE is also as defined in Annex D. For an asynchronous Update_Status message, the value of the Report Type is $02.

The Sequence Exchange IE is as defined in Annex D. The PVC Status IE is as defined in Annex D. One PVC Status IE will be present for each PVC which has undergone a status change. Note that allowing multiple PVC Status IE's within an asynchronous Update Status message is a violation of the Annex D specification. However, the overhead associated with sending a single message for each PVC would be excessive.

The format of the Update Status Ack message is also as shown in FIG. 4. The Frame Control Byte, Dst MAC Address, Src MAC Address, Protocol Id and FCS fields are as defined above. The Address field is the 3-byte LAPF address format.

The Control, Protocol Discriminator, Call Reference and Message Type fields are as defined in Annex D. The Report Type IE is as defined in Annex D. For an Update_Status_Ack message, the value of the Report Type is $82.

The Sequence Exchange IE is as defined in Annex D.

The PVC Status IE is as defined in Annex D. One PVC Status IE is present for each PVC which had its new bit set in the corresponding Asynch Status message.

The following parameters are used by the method according to the invention:

nT1: length of time, in seconds, that a station will wait for a subset status message after sending a subset status enquiry in the initialization state.

nT1Ack: length of time, in seconds, that a station will wait for a response to a message in the post-initialization state.

nN1: the number of nT1Ack intervals between Subset Status Requests in the post-initialization state.

Distinct time-out values exist for each state to allow more tolerance during initialization.

The default values, which are user configurable, are as follows:

| | |
|---|---|
| nT1: | 5 seconds |
| nT1Ack: | 1 second |
| nN1: | 20 |

In the method in accordance with the invention, a DLCI Range Information Element (IE) is provided so that frame size does not limit the number of connections supported; and each message is with respect to a range of connections with several messages providing coverage of the full range. Also, more than one Asynchronous STATus IE is packed into each Asynchronous STATus message.

We claim:

1. A method of managing an interface to an internal message pipe interconnecting communications entities in a packetized communications system wherein permanent virtual connections (PVCs) are established in said message pipe, said method comprising sending from a transmitting entity a subset status enquiry message to request the status of each PVC in the pipe having a DLCI (Data Link Connection Identifier) in a specified range, receiving a subset status message containing sequence exchange numbers corresponding to the last status message sent out, updating an entity's PVC's in response to said received subset status message, and propagating PVC status changes between the communicating entities on said pipe.

2. A method as claimed in claim 1, wherein said entities are frame relay engines.

3. A method as claimed in claim 2, wherein said pipe is an FDDI bus.

4. A method as claimed in claim 1, wherein said pipe is an ATM bus.

5. A method as claimed in claim 1, wherein said enquiry messages are sent over a DLCI 0 link.

6. A method as claimed in claim 1, wherein more than one Asynchronous status IE is packed into each Asynchronous status message.

* * * * *